United States Patent [19]

Ferenc

[11] Patent Number: 5,101,080
[45] Date of Patent: Mar. 31, 1992

[54] BUSBAR FOR CURRENT DISTRIBUTOR RAILS, SWITCHGEAR AND THE LIKE

[75] Inventor: Boros Ferenc, Lohmar, Fed. Rep. of Germany

[73] Assignee: Klöckner-Moeller Elektrizitäts-GmbH, Bonn, Fed. Rep. of Germany

[21] Appl. No.: 555,273

[22] Filed: Jul. 18, 1990

[51] Int. Cl.[5] .......................... H02G 5/10; H02B 1/20
[52] U.S. Cl. .................................. 174/68.2; 174/16.2; 174/70 B; 174/99 B; 174/100; 174/171; 361/344; 361/355; 361/361; 439/110
[58] Field of Search .................. 174/16.2, 68.2, 70 B, 174/71 B, 72 B, 88 B, 99 B, 99 E, 100, 129 B, 133 B, 149 B, 171; 361/341, 342, 347, 348, 355, 361, 378; 439/110, 116, 117, 118, 212

[56] References Cited

U.S. PATENT DOCUMENTS 2,904,621 9/1959 Grier ........................ 174/16.2 X
3,210,716 10/1965 Meacham ................... 174/70 B X

FOREIGN PATENT DOCUMENTS

| 0345910 | 12/1989 | European Pat. Off. |
|---|---|---|
| 1905584 | 12/1964 | Fed. Rep. of Germany ..... 174/68.2 |
| 3819575 | 12/1989 | Fed. Rep. of Germany ..... 174/68.2 |
| 416252 | 12/1980 | Sweden . |
| 0449150 | 4/1987 | Sweden ........................ 174/68.2 |
| 0388402 | 6/1965 | Switzerland . |

Primary Examiner—Morris H. Nimmo
Attorney, Agent, or Firm—Nils H. Ljungman & Associates

[57] ABSTRACT

A busbar is provided for current distribution systems such as busbar trunking systems, switchgear and the like. The busbar has a C-shaped cross section and walls which are not uniform in thickness. The walls which lie closest to one another in adjacently mounted busbars have a thickness which is greater than the thickness of the walls which lie parallel to the mounting surface onto which the busbars are mounted.

20 Claims, 2 Drawing Sheets

BUSBAR FOR CURRENT DISTRIBUTOR RAILS, SWITCHGEAR AND THE LIKE

BACKGROUND OF THE INVENTION

1. Field of the Invention

This invention relates to a busbar having a C-shaped cross section for busbar trunking systems, switching equipment and the like. Such busbars are used in particular in a busbar system in power distribution equipment and are preferably oriented parallel to one another in a plane by means of rail fasteners.

2. Background Information

Conventional busbars have a solid rectangular cross section, and are fastened parallel to one another at intervals defined by the physical conditions. The busbars are not only subjected to extreme temperature influences, but are also subjected to high mechanical stresses whenever short circuits occur.

In alternating current and three-phase current systems, magnetic fields around the busbars are built up when current flows. These magnetic fields lead to a higher current density in the peripheral regions of the busbars.

In direct-current equipment, the number of busbars connected in parallel can be almost unlimited. However, with alternating current and three-phase current the external rails carry a greater load on account of the current displacement or skin effect. Therefore, as a rule, a maximum of four busbars are connected in parallel and, in order to maintain a more uniform current distribution, the distance between the two innermost busbars is increased, or in other words, the distance between the two innermost busbars is greater than the distance between any one outermost busbar and its adjacent innermost busbar.

The prior art includes busbars having a C-shaped cross section with walls of uniform thickness, whereby the C-shaped profile was designed for the fastening of terminals to the busbar by means of suitable terminal shoes or fastening devices.

In busbar systems in which the conductor busbars are installed in a common plane vertically or horizontally parallel to one another, and the open distance between main conductors is less than 0.8 times the average center-to-center distance between main conductors, the negative influence of the skin effect is more noticeable.

OBJECT OF THE INVENTION

The object of this invention is to design a busbar having a C-shaped cross section, so that, without an increase of the conductor cross section, the busbar exhibits a higher current carrying capacity than conventional busbar shapes.

SUMMARY OF THE INVENTION

This object is achieved by a busbar design having a C-shaped cross section with walls which are not uniform in thickness. In the invention, the wall thickness of the walls which lie closest to one another in adjacently mounted busbars is greater than the wall thickness of the walls which lie parallel to the connection plane.

The invention also has several advantages from the electrical, thermal and mechanical point of view. According to the invention, on account of the non-uniform wall thickness, the thickest portion of the cross section of the C-shaped busbar lies where the current density on the busbar is the highest. Thus the current distribution is more uniform and the thermal losses generated are lower. Because of the smaller thermal losses, the smaller cross section of the busbar of the invention allows for a more efficient utilization of the cross section in carrying current. Up to 50% more current can be carried by the busbars having the C-shaped cross section of the present invention than can be carried by the busbars of the prior art having a rectangular cross section with the same cross sectional area as the C-shaped busbar. As a result of the more uniform current distribution, the current carrying capacity of the materials used, such as copper, aluminum or aluminum alloys, can be increased by at least 30% to 50%.

With busbars having the same amount of material, the moment of resistance of C-shaped busbars is also significantly improved over the moment of resistance of rectangular busbars. This improvement in the moment of resistance occurs as a result of the more favorable distribution of material over the cross section of the profile. This improved mechanical value makes possible the use of larger distances between busbar supports, even in the presence of high dynamic loads. There are also improvements in the mechanical values in both axes of the C-shaped cross sectional busbar so that, even when a short circuit occurs, deformations of such busbars can substantially be eliminated.

Using the same amount of material, or up to 25% less, the C-shaped cross section busbar generates an amount of heat which is lower than the amount of heat generated in busbars of the prior art. This represents a significant improvement for the overall thermal balance of the distribution systems equipped with such busbars. By narrowing the distance between busbars, it is possible, in particular when such busbars are installed vertically, to achieve a ventilation of such busbar systems as a result of the chimney effect produced. When the busbars are installed horizontally, there can be a forced ventilation of the space inside the busbars.

One aspect of the invention resides broadly in a busbar for current distribution systems such as busbar trunking systems, switchgear or the like, the busbar having a longitudinal axis disposed along its length, the busbar comprising: a C-shaped cross-section; a plurality of side portions disposed around and substantially parallel to the longitudinal axis; the plurality of side portions comprising a first set of substantially parallel side portions and a second set of substantially parallel side portions; the side portions of the first and second sets having thickness; and at least one side portion of the first set for being disposed adjacent to an adjacent busbar in a parallel busbar installation, which side portion has a thickness greater than a thickness of at least one side portion of said second set.

A further aspect of the invention resides broadly in a busbar arrangement for current distribution systems such as busbar trunking systems, switchgear or the like, the busbar arrangement comprising: a plurality of busbars each having a C-shaped cross-section; the plurality of busbars being fastened to a support surface in a substantially mutually parallel arrangement by means of a bar fastener; the plurality of busbars each having a plurality of side portions; the plurality of busbars comprising at least a first and a second busbar, with the first busbar being disposed adjacent to the second busbar; the plurality of side portions comprising a first set of substantially parallel side portions and a second set of substantially parallel side portions; the side portions of the first and second sets having thicknesses; and at least one side portion of the first set of the first busbar being disposed adjacent to the second busbar, which side portion has a thickness greater than the thickness of at least one side portion of the second set of side portions of the first busbar.

A still further aspect of the invention resides broadly in a busbar for current distribution systems such as busbar trunking systems, switchgear or the like, the busbar comprising a C-shaped cross-section; a plurality of side portions disposed about the longitudinal axis, with at least a portion of the plurality of side portions being substantially parallel to the longitudinal axis; the plurality of side portions comprising a first set of substantially parallel side portions and a second set of substantially parallel side portions; the side portions of the first and second sets having thicknesses; and at least one side portion of the first set having a thickness greater than a thickness of at least one side portion of the second set.

BRIEF DESCRIPTION OF THE DRAWINGS

One preferred embodiment of the invention is schematically illustrated in the accompanying drawings.

DESCRIPTION OF THE PREFERRED EMBODIMENT

Figure 1:
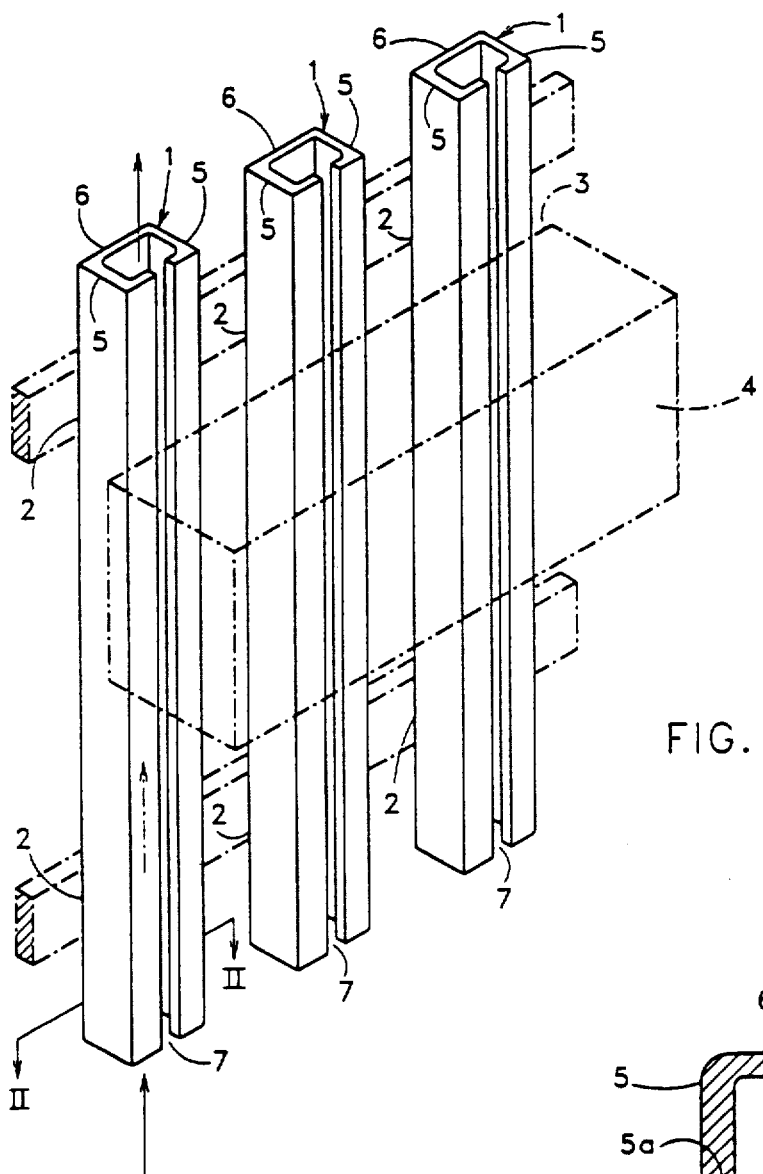
FIG. 1 shows a vertical, parallel arrangement of several busbars having a C-shaped cross section.

FIG. 1 shows three busbars 1 having a C-shaped cross section installed in a common plane parallel to one another. In this arrangement, the bar fasteners 2 lie behind the connection plane 3 for electrical switchgear 4 or similar equipment, so that the entire front connection plane 3 of the busbars 1 remains available for the connection of electrical switchgear 4 and similar devices.

Figure 2:
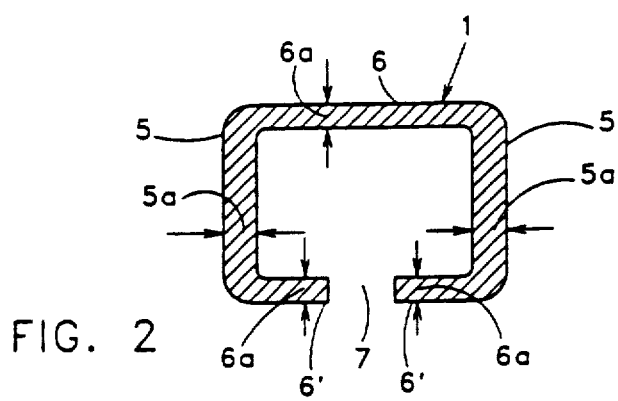
FIG. 2 is an enlarged cross section through one of the busbars along Line II—II in FIG. 1.
Figure 3:
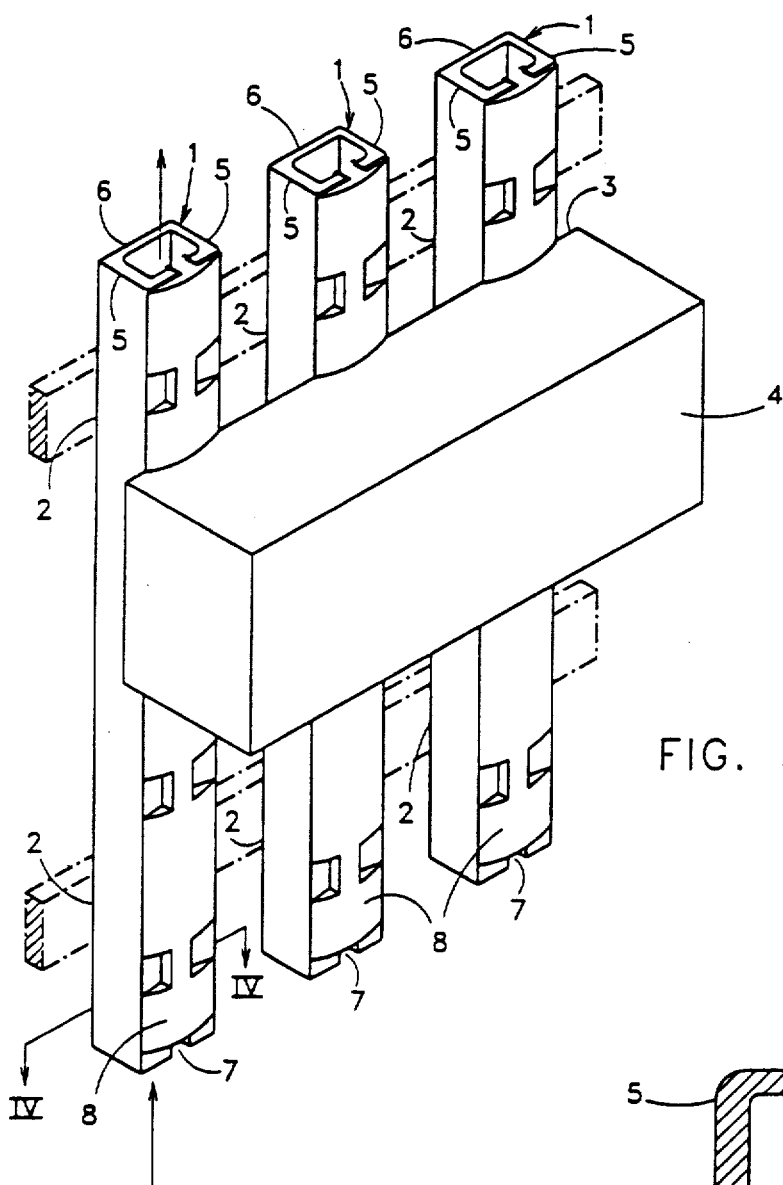
FIG. 3 shows the vertical arrangement of busbars of FIG. 1 with a cover disposed over the slot.
Figure 4:
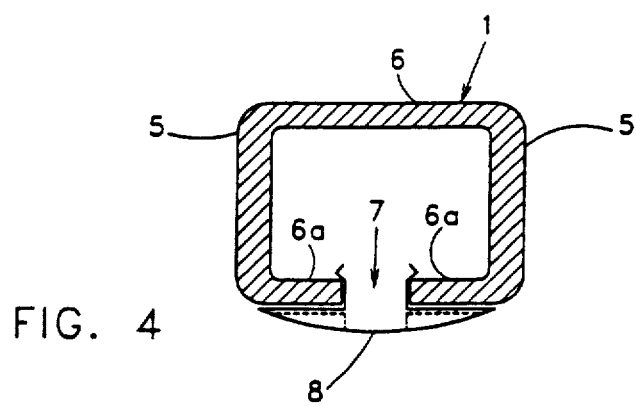
FIG. 4 shows an enlarged cross-section of the busbars taken along line IV—IV of FIG. 3.

As shown in the cross section in FIG. 2, the wall thicknesses of the C-shaped cross section of the three busbars 1 in FIG. 1 are not uniform. The walls 5 which are closest to one another when the busbars 1 are installed, have a greater thickness 5a than the thickness 6a of the walls 6, 6' which are parallel to the connection plane 3.

When the busbars 1 are oriented vertically, there is a natural ventilation of the cross section of the bar on account of the chimney effect. This natural ventilation can be enhanced by covering the longitudinal slot 7 of the C-profile of the busbars 1. With a cover 8. When the busbars 1 are installed horizontally, there can be an additional forced ventilation of the space inside the bars.

As shown in FIG. 2 in particular, the wall thickness 5a of the thicker walls 5 of the C-shaped cross section is preferably approximately 50% greater than the wall thickness 6a of the walls 6, 6' of the busbars.

A busbar of the type of the present invention may, for example, have an overall cross-sectional dimension being in the range of about 2" wide by about 1½" deep. In this example, the two walls 5 preferably have dimensions being in the range of about 1½" wide by about ¼" thick, the wall 6 preferably has dimensions being in the range of about 2" wide by about 5/32" thick and the walls 6' preferably have dimensions being in the range of about 13/16" wide by about 5/32" thick. The longitudinal slot 7 preferably has a width being in the range of about 3/8" and the internal cavity preferably has a cross-sectional dimension being in the range of about 1½" wide by about 1 1/8" deep. A busbar of this type may also have alternate dimensions, with all dimensions being substantially proportional to the dimensions given hereabove.

Other busbars which may be used as examples comprise busbars of conventional rectangular dimensions constructed of copper. These copper busbars may have cross-sectional dimensions of about 1/8" thick by 1" wide, 1/8" thick by 2" wide, or 1/8" thick by 3" wide, or alternately about ¼" thick by 1" wide, ¼" thick by 2" wide, ¼" thick by 3" wide, or ¼" thick by 4" wide. Other busbars of conventional rectangular dimensions may be constructed of aluminum and may have cross-sectional dimensions of about ¼" thick by 2" wide or ¼" thick by 3" wide or alternately about 3/8" thick by 2" wide or 3/8" thick by 3" wide. These dimensions for conventional busbars were obtained from the Allegheny Power System Engineering Manual, Conductors and Fittings section, pages 9-15. Conventional rectangular busbars having alternative dimensions may be available for other uses. These alternative busbars may be modified according to the present invention such that the 1/8" thick walls are, for example, 3/16" thick for the thicker walls, the ¼" thick walls are, for example, 3/8" thick for the thicker walls, and the 3/8" thick walls are, for example, 9/16" thick for the thicker walls. Each of these dimensions is relative, and should be taken as examples only.

In summary, one feature of the invention resides broadly in a busbar having a C-shaped cross section for busbar trunking systems, switchgear and the like, which busbars are used in particular for current distribution systems and are oriented parallel to one another in a plane by means of bar fasteners, which busbars are characterized by the fact that the wall thicknesses 5a, 6a of the C-shaped profile cross section are not uniform, so that those walls 5 which lie closest to one another when the busbars 1 are installed next to one another have a greater thickness 5a than the walls 6, 6' lying parallel to the connection plane 3.

Another feature of the invention resides broadly in a busbar characterized by the fact that the wall thickness 5a of the thicker walls 5 of the C-shaped profile cross section is preferably approximately 50% greater than that of the walls 6, 6' lying parallel to the connection plane 3.

Yet another feature of the invention resides broadly in a busbar characterized by the fact that the longitudinal slot 7 of the C-profile of the busbar 1 is covered.

A further feature of the invention resides broadly in a busbar characterized by the fact that there is a forced ventilation of the inside of the busbar 1.

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof may be made without departing from the spirit and scope of the invention.

What is claimed is:

1. A busbar for current distribution systems such as busbar trunking systems, said busbar having a longitudinal axis disposed along its length, said busbar comprising:
   a C-shaped cross section;
   a plurality of side portions disposed around said longitudinal axis, at least one of said plurality of side portions being disposed substantially parallel to said longitudinal axis;
   said plurality of side portions solely comprising:
      a first set of two side portions, said two side portions of said first set of side portions being substantially mutually parallel; and
      a second set of two side portions, said two side portions of said second set of side portions being substantially mutually parallel;
   said two side portions of said second set of side portions being disposed substantially perpendicularly to and between said two side portions of said first set of side portions:
   one side portion of said second set of side portions defining a longitudinal slot therein;
   said side portions of said first and said second sets of side portions having thicknesses;
   at least one side portion of said first set of side portions for being disposed adjacent to an adjacent busbar in a parallel busbar installation; and
   said at least one side portion of said first set of side portions having a thickness greater than a thickness of at least one side portion of said second set of side portions.

2. The busbar according to claim 1, wherein said thickness of said side portions of said first set of side portions is in the range of about 50% greater than said thickness of said side portions of said second set of side portions.

3. The busbar according to claim 2, wherein at least one side portion of said second set of side portions is fastenable to a support surface by at least one fastening means, said busbar being configured to accept the at least one fastening means.

4. The busbar according to claim 3, wherein said side portion of said second set of side portions defining said longitudinal slot is disposed substantially parallel to and spaced apart from said at least one fastenable side portion of said second set of side portions.

5. The busbar according to claim 4, further comprising cover means for being disposed adjacent the busbar to cover the longitdunal slot.

6. The busbar according to claim 5, wherein:
   said plurality of side portions define an interior space, said interior space being self-ventilating when said busbar is disposed substantially vertically, and said interior space being force ventilated by ventilating means when said busbar is disposed substantially horizontally;
   said side portions of said first and said second sets of side portions having substantially uniform thickness throughout the side portions; and
   said side portions of said first and said second sets of side portions being substantially straight.

7. A busbar arrangement for current distribution systems such as busbar trunking systems, said busbar arrangement comprising:
   a plurality of busbars each having a C-shaped cross section;
   each of said plurality of busbars being fastened to a support surface in a substantially mutually parallel arrangement by means of at least one fastening means for fastening said plurality of busbars to said support surface;
   said plurality of busbars comprising at least a first and a second busbar, said first busbar being disposed adjacent to said second busbar;
   said plurality of busbars each having a plurality of side portions;
   each of said plurality of side portions comprising:
   a first set of side portions, at least two side portions of said first set of side portions being substantially mutually parallel; and
   a second set of side portions, at least two side portions of said second set of side portions being substantially mutually parallel;
   at least one of said at least two side portions of said second set of side portions being fastenable to the support surface by means of the at least one fastening means;
   said at least one of said at least two side portions of said second set of side portions comprising a straight side portion extending perpendicularly between and connecting said at least two parallel side portions of said first set of side portions;
   said side portions of said first and said second sets of side portions having thicknesses;
   at least one side portion of said first set of side portions of said first busbar being disposed adjacent said second busbar; and
   said at least one side portion of said first set of side portions of said first busbar having a thickness greater than a thickness of at least one side portion of said second set of side portions of said first busbar.

8. The busbar arrangement according to claim 7, wherein at least one side portion of said first set of side portions of said second busbar is disposed adjacent said first busbar.

9. The busbar arrangement according to claim 8, wherein said at least one side portion of said first set of side portions of said second busbar has a thickness greater than a thickness of at least one side portion of said second set of side portions of said second busbar.

10. The busbar arrangement according to claim 9, further comprising a third busbar, said third busbar being disposed adjacent at least one of said first busbar and said second busbar, said third busbar comprising a plurality of side portions, said plurality of side portions of said third busbar comprising:
   a first set of side portions, at least two side portions of said first set of side portions being substantially mutually parallel; and
   a second set of side portions, at least two side portions of said second set of side portions being substantially mutually parallel.

11. The busbar arrangement according to claim 10, wherein at least one side portion of said first set of side portions of said third busbar is disposed adjacent said at least one of said first busbar and said second busbar.

12. The busbar arrangement according to claim 11, wherein said at least one side portion of said first set of side portions of said third busbar has a thickness greater than a thickness of at least one side portion of said second set of side portions of said third busbar.

13. The busbar arrangement according to claim 12, wherein said thickness of said side portions of said first set of side portions of each of said first, second and third busbars, is in the range of about 50% greater than said thickness of said side portions of said second set of side portions of each of said first, second and third busbars.

14. The busbar arrangement according to claim 13, wherein at least one side portion of said second set of side portions of each of said first, second and third busbars is fastened to the support surface by means of the at least one fastening means.

15. The busbar arrangement according to claim 14, wherein at least two side portions of said second set of side portions of each of said first, second and third busbars are disposed substantially parallel to and spaced apart from said at least one fastened side portion of said second set of side portions of each of said first, second and third busbars.

16. The busbar arrangement according to claim 15, wherein said at least two side portions of said second set of side portions of each of said first, second and third busbars define a longitudinal slot disposed therebetween, said longitudinal slot being coverable by cover means.

17. The busbar arrangement according to claim 16, wherein each said plurality of side portions of each of said first, second and third busbars defines an interior space, said interior space being self-ventilating when said busbar is disposed substantially vertically, and said interior space being force ventilated by ventilating means when said busbar is disposed substantially horizontally.

18. A busbar for current distribution systems such as busbar trunking systems, said busbar having a longitudinal axis disposed along its length, said busbar comprising:
a C-shaped cross section;
a plurality of side portions disposed about said longitudinal axis, at least one of said plurality of side portions being disposed substantially parallel to said longitudinal axis;
said plurality of side portions comprising:
a first set of side portions, at least two side portions of said first set of side portions being substantially mutually parallel; and
a second set of side portions, at least two side portions of said second set of side portions being substantially mutually parallel, said at least two side portions of said second set of side portions being substantially perpendicular to and between said at least two side portions of said first set of side portions; at least one side portion of said second set of side portions for being fastened to a support surface by fastening means;
said side portions of said first and said second sets of side portions having thicknesses; and
at least one side portion of said first set of side portions having a thickness substantially 50% greater than a thickness of at least one side portion of said second set of side portions.

19. The busbar according to claim 18, wherein:
said second set of side portions comprises at least three side portions, at least two of said at least three side portions of said second set of side portions being spaced apart and parallel to at least a third of said at least three side portions; and
said at least two of said at least three side portions of said second set of side portions being spaced a distance apart to define a longitudinal slot therebetween.

20. The busbar according to claim 19, wherein:
each of said side portions of said first and said second sets of side portions have widths;
said at least two parallel side portions of said first set of side portions have dimensions of about 1½ inches wide by about ¼ inch thick;
said at least two of said at least three side portions of said second set of side portions have dimensions of about 13/16 inches wide by about 5/32 inch thick;
said at least a third of said at least three side portions of said second set of side portions has dimensions of about 2 inches wide by 5/32 inch thick; and
the distance between said at least two of said at least three side portions of said second set of side portions which defines the longitudal slot is about 3/8 inch.

* * * * *

UNITED STATES PATENT AND TRADEMARK OFFICE
CERTIFICATE OF CORRECTION

PATENT NO. : 5,101,080
DATED      : March 31, 1992
INVENTOR(S): Ferenc BOROS

It is certified that error appears in the above-indentified patent and that said Letters Patent is hereby corrected as shown below:

"Boros Ferenc" and insert --Ferenc Boros--. Title page, item 75, delete

"Ferenc" and insert --Boros--. Title page, item 19, delete

Signed and Sealed this

Fifth Day of September, 1995

Attest:

BRUCE LEHMAN

*Attesting Officer*       *Commissioner of Patents and Trademarks*